United States Patent [19]

Hiramatsu

[11] Patent Number: 4,468,988

[45] Date of Patent: Sep. 4, 1984

[54] SLIP CONTROL SYSTEM FOR A CLUTCH

[75] Inventor: Takeo Hiramatsu, Kyoto, Japan

[73] Assignee: Mitsubishi Jidosha Kogyo Kabushiki Kaisha, Tokyo, Japan

[21] Appl. No.: 288,106

[22] Filed: Jul. 29, 1981

[30] Foreign Application Priority Data

Aug. 4, 1980 [JP] Japan .................................. 55-107030
Mar. 18, 1981 [JP] Japan .................................... 56-37891
Apr. 21, 1981 [JP] Japan .................................... 56-61060

[51] Int. Cl.$^3$ ........................ B60K 41/16; B60K 41/19
[52] U.S. Cl. ............................................. 74/868; 192/3.58; 192/103 R; 192/82 T; 74/732; 74/733; 74/866
[58] Field of Search ................. 74/869, 868, 867, 866, 74/865, 733, 732, 752 A; 192/3.58, 3.31, 3.3, 3.29, 3.28, 0.032, 0.033, 103 R, 82 T

[56] References Cited

U.S. PATENT DOCUMENTS

| | | | |
|---|---|---|---|
| 3,497,043 | 2/1970 | Leonard | 74/869 X |
| 4,287,792 | 9/1981 | Dailey | 74/863 |
| 4,338,832 | 7/1982 | Pelligrino | 74/866 |
| 4,361,060 | 11/1982 | Smyth | 74/866 |

FOREIGN PATENT DOCUMENTS 109854 8/1980 Japan .................................. 192/3.31
24255 3/1981 Japan .................................. 192/3.29
2066919 7/1981 United Kingdom ............. 192/0.033

Primary Examiner—Allan D. Herrmann
Assistant Examiner—D. Wright
Attorney, Agent, or Firm—Oldham, Oldham, Hudak, Weber & Sand, Co.

[57] ABSTRACT

A torque transmitting system for transmitting torque from a drive shaft of an engine to an output shaft without transmitting torque variation comprises a friction clutch unit interposed between these shafts, a fluid pressure-operated actuating unit for engaging and disengaging the friction clutch unit, operating condition detectors detecting the operation condition of the engine, and a rotation speed difference detector for detecting the rotation speed difference between the drive shaft and the output shaft. In the system, means are provided for setting the rotation speed difference between the shafts on the basis of the output signals from the operating condition detectors and for controlling the pressure of actuating fluid supplied to the fluid pressure-operated actuating unit so that the detected rotation speed difference approaches the pre-set rotation speed difference, whereby the torque can be transmitted from the drive shaft to the output shaft without any substantial variation.

20 Claims, 16 Drawing Figures

FIG. 7

| MODE | ELEMENT | 1ST CLUTCH | 2ND CLUTCH | 1ST BRAKE | 2ND BRAKE | ONE-WAY CLUTCH | GEAR RATIO |
|---|---|---|---|---|---|---|---|
| FORWARD | 1ST SPEED | ○ | | | (○) | ○ | $Z_A/Z_{S1}$ |
| | 2ND SPEED | ○ | | ○ | | | $\dfrac{Z_A(Z_{S1}+Z_{S2})}{Z_{S1}(Z_A+Z_{S2})}$ |
| | 3RD SPEED | ○ | ○ | | | | 1.000 |
| NEUTRAL | | | | | | | — |
| REVERSE | | | ○ | | ○ | | $Z_A/Z_{S2}$ |

○ : ENGAGE
(○) : ENGAGE DURING ENGINE BRAKING

FIG. 8

| NUMBER OF TEETH | SMALL SUN GEAR | LARGE SUN GEAR | ANNULUS GEAR |
|---|---|---|---|
| | $Z_{S1}$ | $Z_{S2}$ | $Z_A$ | ns
SLIP CONTROL SYSTEM FOR A CLUTCH

BACKGROUND OF THE INVENTION

This invention relates to a torque transmitting system.

In an internal combustion engine of reciprocating piston type, the driving torque tends to vary due to the inertia of the pistons making reciprocating movement, and the driving torque tends to also vary due to the variation of the internal pressure of the combustion chambers. Therefore, the drive shaft rotates with the tendencies of variations of both torque and rotation speed. Such a torque variation occurs also in an internal combustion engine of rotary piston type or in a steam engine of piston type and is not null even in an electric motor. The torque variation pointed and above is objectionable in that it impairs the driveability of a vehicle or the like driven by the prime mover of the kind above described and it degrades the precision machining with a machine tool or the like driven by the prime mover.

Especially, in a vehicle, the torque variation is transmitted to the vehicle body, drive shaft and other parts during running of the vehicle at low speeds, and, even when the mean driving torque is large enough to drive the vehicle, the allowable speed limit in the low rotation speed range will be substantially increased as a result of generation of vibration due to the torque variation, and the driver must select a speed of higher gear ratio in order to deal with the above situation. The resultant increase in the rotation speed of the prime mover or engine has given rise to such disadvantages that the fuel consumption increases and greater noise is generated.

Further, when an internal combustion engine is provided with a transmission, transmission of the torque variation through the transmission during the idle driving of the engine has given rise to such a trouble that the gears, shafts and other parts in the transmission are excessively vibrated to generate rattling noise.

SUMMARY OF THE INVENTION

It is therefore a primary object of the present invention to provide a torque transmitting system which can efficiently transmit torque from the drive shaft to the output shaft of an internal combustion engine without transmitting any torque variation to the output shaft and can prevent generation of vibration and noise, while, at the same time, reducing the fuel consumption.

Another object of the present invention is to provide a torque transmitting system for use with an internal combustion engine mounted on an automotive vehicle, which system can widen the operable low rotation speed range of the engine thereby facilitating the drive while, at the same time, reducing the fuel consumption.

Still another object of the present invention is to provide a torque transmitting system for use with an automatic transmission of fluid coupling type for an automotive vehicle, which system can narrow the operation range in which an excessive slip peculiar to the fluid coupling tends to appear.

Yet another object of the present invention is to provide a torque transmitting system for use with an automatic transmission of fluid coupling type having a plurality of forward speeds and provided with a fluid pressure-actuated friction clutch for directly coupling the parts of the fluid coupling, which system reduces the pressure of actuating fluid supplied to the friction clutch during a shift from one speed mode to another thereby alleviating impartation of shock during such a shift, so that the fluid coupling parts can be directly coupled by the friction clutch at the lower speed, while, at the same time, reducing the fuel consumption.

Still another object of the present invention is to provide a torque transmitting system for use with an automatic transmission having a plurality of forward speeds and provided with a fluid coupling and a fluid pressure-actuated friction clutch disposed in parallel between the drive shaft of an internal combustion engine and the output shaft, which system reduces the pressure of actuating fluid supplied to the friction clutch under the floating condition in which the mean output between the two shafts is nearly null, thereby preventing generation of noise and wear due to rattling of the gears and associated parts in the automatic transmission.

According to the present invention, the various objects described above are attained by a torque transmitting system which comprises a drive shaft rotating with torsional vibration, an output shaft, a friction clutch unit interposed between the drive shaft and the output shaft, fluid pressure-operated actuating means for causing engagement and disengagement of the friction clutch unit, means for detecting the operating condition of a drive power source driving the drive shaft, means for detecting the difference between the rotation speed of the drive shaft and that of the output shaft, means for setting the rotation speed difference between the dirve shaft and the output shaft in response to the output signal from the operating condition detecting means, and fluid pressure control means for controlling the pressure of actuating fluid supplied to the fluid pressure-operated actuating means so that the rotation speed difference detected by the rotation speed difference detecting means approaches the rotation speed difference set by the rotation speed difference setting means.

Various other objects can also be achieved by the present invention as will become apparent from the detailed description of preferred embodiments when read in conjunction with the accompanying drawings.

BRIEF DESCRIPTION OF THE DRAWINGS

The present invention will now be described in detail with reference to the accompanying drawings, in which:

FIG. 7 is a table showing the operation mode of the transmission shown in FIG. 3;

FIG. 8 is a table showing the number of teeth of the gears in the planetary gear mechanism shown in FIG. 4;

DESCRIPTION OF THE PREFERRED EMBODIMENTS

A first embodiment of the torque transmitting system of the present invention, when applied to the driving system of an automotive vehicle, will now be described in detail with reference to FIGS. 1 to 14.

Figure 1:
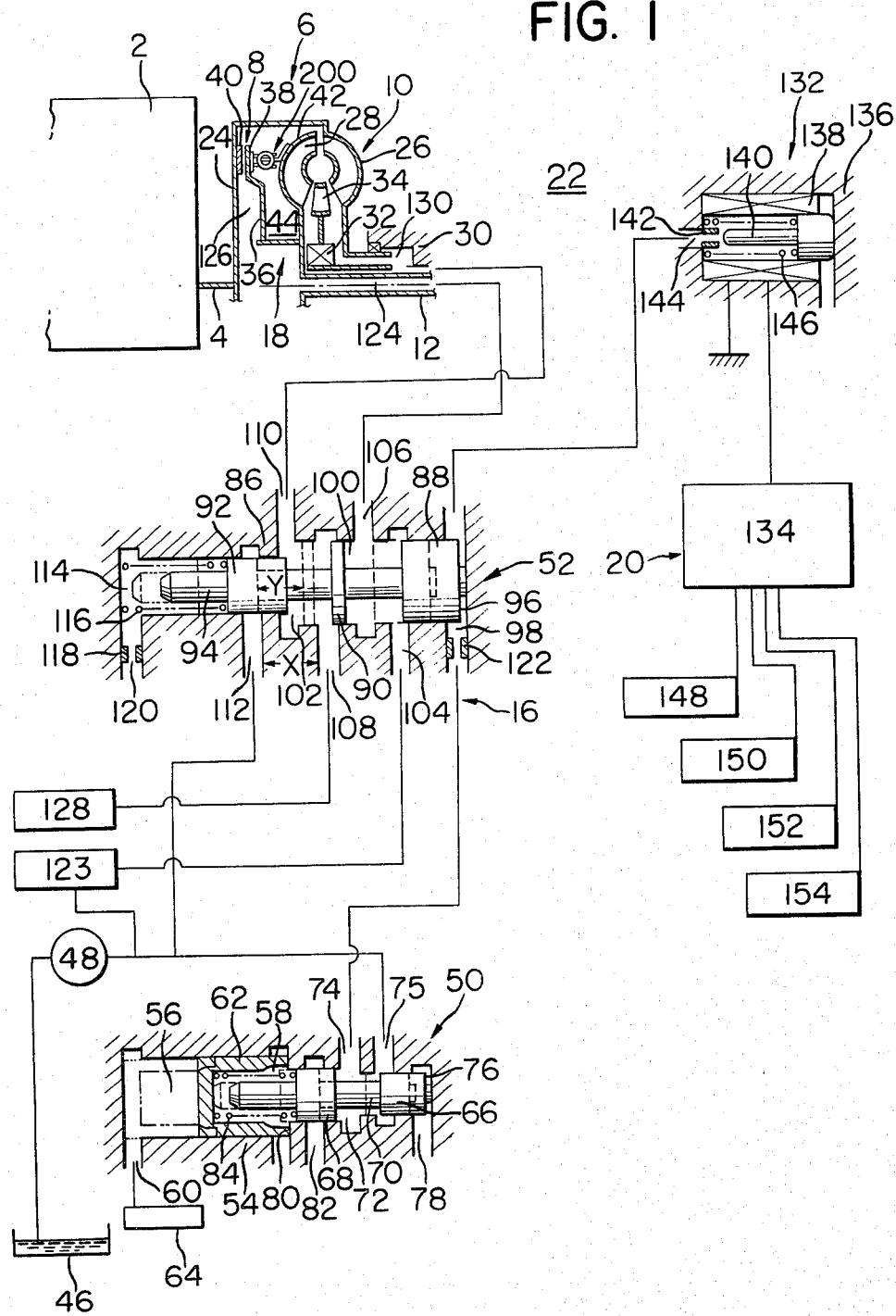
FIG. 1 is a schematic sectional view showing the structure of a first embodiment of the torque transmitting system according to the present invention.

Referring first to FIG. 1, an internal combustion engine 2 of reciprocating piston type includes a crankshaft 4 which is a drive shaft. A torque transmitting device 6 comprises a friction clutch unit 8 and a torque convertor 10, and its output shaft 12 constitutes an input shaft of a transmission 14 shown in FIG. 3. A fluid supply system 16 supplied fluid under controlled pressure to a fluid pressure-operated actuating unit 18 which acts to engage and disengage the friction clutch unit 8. An electrically-controlled control unit 20 controls the pressure of fluid supplied from the fluid supply system 16. The elements ranging from the crankshaft 4 to the control unit 20 constitute a torque transmitting system 22.

The friction clutch unit 8 and the torque convertor 10 are formed as an integral assembly which includes a flywheel 24 fixedly mounted on the crankshaft 4, a pump 26 fixedly mounted on the flywheel 24, a turbine 28 disposed opposite to the pump 26 and splined to the output shaft 12 for retation therewith, a stator 34 supported on a housing 30 through a one-way clutch 32, a piston 36 disposed for rotation with the turbine 28 through an elastic connecting device described later and for sliding movement and rotating movement relative to the output shaft 12, and a friction plate 40 attached on the flywheel 24 at a position opposite to a peripheral portion 38 of the piston 36. The fluid pressure-operated actuating unit 18 includes a fluid chamber 44 defined between the outer wall surface 42 of the turbine 28 and the inner wall surface of the piston 36.

Figure 2:
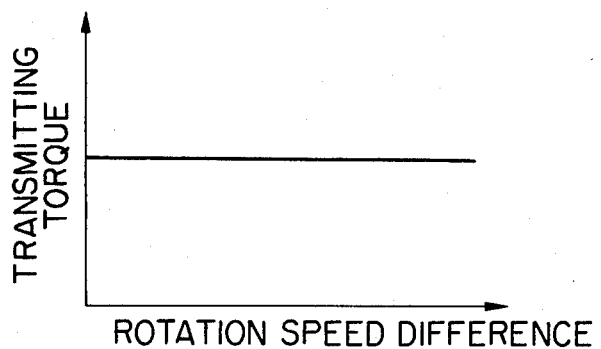
FIG. 2 is a graph showing the relation between the rotation speed difference and the transmitting torque in the torque transmitting system.

Although the facing material for the friction plate 40 in the friction clutch unit 8 may be used any one of organic frictional materials employed commonly in the field of the automobile industry, the rate of change of the friction coefficient relative to the slipping speed which occurs between the friction plate 40 and the piston 36, that is, the $\mu$-v characteristic is preferably as flat as possible. From this viewpoint, a somewhat softer one among the conventional organic frictional materials is preferably used to minimize the rate of change of the friction coefficient relative to the slipping speed. In the friction clutch unit 8 using such a facing material, constant torque corresponding to the force of the piston 36 exerted upon the friction plate 40 is only transmitted to the output shaft 12 when the difference between the rotation speed of the crankshaft 4 and that of the output shaft 12 lies within a certain range, as shown in FIG. 2.

A plurality of radial grooves and/or circumferential grooves are suitably provided on the surface of the friction plate 40 so as to prevent overheating of the friction plate.

The fluid supply system 16 includes an oil pump 48 for pumping out fluid from an oil reservoir 46 for feeding fluid under pressure, a pressure reducing valve unit 50 for reducing the pressure of fluid pumped by the oil pump 48, which pressure varies between for example 4.4 kg/cm$^2$ and 7 kg/cm$^2$, to a predetermined fluid pressure which is for example 3.5 kg/cm$^2$, and a fluid pressure control unit 52 for supplying actuating fluid under controlled pressure to the fluid chamber 44 of the fluid pressure-operated actuating unit 18 actuating the friction clutch unit 8.

The pressure reducing valve unit 50 includes a cylinder 54, a piston chamber 56 and a spool valve chamber 58 formed in the cylinder 54, a fluid passage 60 communicating always with the piston chamber 56, a piston 62 disposed in the piston chamber 56, a transmission operation mode detector 64 which communicates with the fluid passage 60 and does not produce fluid under pressure when the transmission 14 is selected to operate in its neutral mode, reverse mode or lowest speed mode, but produces fluid under pressure when the transmission 14 is selected to operate in any one of the other speed modes, a spool valve 70 disposed in the spool valve chamber 58 and having a first land 66 of small sectional area and a second land 68 of large sectional area, a fluid passage 74 communicating always with a fluid supply chamber 72 defined between the first and second lands 66 and 68 of the spool valve, a fluid passage 75 communicating with the fluid supply chamber 72 when the spool valve 70 is in its rightmost position, a fluid discharge passage 78 facing the right-hand end face 76 of the first land 66 of the spool valve 70, a limiting shoulder 80 limiting rightward movement of the piston 62, a fluid discharge passage 82 communicating with the fluid supply chamber 72 when the piston 62 is in the illustrated rightmost position and the spool valve 70 is in its leftmost position shown by the broken line in FIG. 1, and a spring 84 disposed under compression between the piston 62 and the spool valve 70.

The fluid pressure control unit 52 includes a cylinder 86, a spool valve 94 disposed in the cylinder 86 and having a first land 88 of large sectional area, a second land 90 of similarly large sectional area and a third land 92 of small sectional area arranged from the left to the right in the above order in FIG. 1, a fluid passage 98 facing the right-hand end face 96 of the first land 88 of the spool valve 94, a fluid discharge chamber 100 defined between the first land 88 and the second land 90 of the spool valve, a fluid supply chamber 102 defined between the second and third lands 90 and 92 of the spool valve, a fluid passage 104 communicating with the fluid discharage chamber 100 when the spool valve 94 is in the vicinity of the end of its rightward stroke as shown in FIG. 1, a fluid passage 106 communicating always with the fluid discharge chamber 100, a fluid passage 108 communicating with the fluid supply chamber 102 when the spool valve 94 is in the vicinity of the end of its rightward stroke, but communicating with the fluid discharge chamber 100 when the spool valve is in the vicinity of the end of its leftward stroke, a fluid passage 110 communicating always with the fluid supply chamber 102, a fluid passage 112 communicating with the fluid supply chamber 102 when the spool valve 94 is in the vicinity of the end of its leftward stroke, a fluid discharge chamber 114 defined between the left-hand end of the cylinder 86 and the third land 92 of the spool valve 94, a spring 116 disposed under compression in the fluid discharge chamber 114, and a fluid discharge passage 120 connecting the fluid discharge chamber 114 to the oil reservoir 46 and having an orifice 118 therein. The fluid passage 98 is connected at one end thereof to the fluid passage 74 of the pressure reducing valve unit 50 through an orifice 122 and at the other end thereof to a solenoid valve 132 of the electrically-controlled control unit 20. The fluid passage 104 is connected to a torque convertor control valve 123 of conventional structure which includes a spool (not shown) and a spring (not shown) and in which the biasing force of the spring normally biasing the spool in one direction is suitably adjusted so that the pressure of fluid delivered from the oil pump 48 can be reduced to and maintained at a predetermined value of for example 2 kg/cm$^2$ to 3 kg/cm$^2$. The fluid passage 106 is connected to an auxiliary fluid chamber 126 defined between the piston 36 and the flywheel 24 by way of a fluid passage 124 formed in the output shaft 12. The fluid passage 108 is connected through an oil cooler 128 to the lubrication system (not shown) for the transmission 14 shown in FIG. 3. The fluid passage 110 is connected to the fluid chamber 44 through the space 130 around the output shaft 12 and through the internal space of the pump 26. The fluid passage 112 is connected to the oil pump 48.

The electrically-controlled control unit 20 includes a solenoid valve 132 controlled by a pulse current, a computer 134 controlling the pulse current supplied to the solenoid valve 132, and a plurality of input units applying individual output signals to the computer 134.

The solenoid valve 132 includes a housing 136, a solenoid 138 disposed in the housing, a valve member 140 disposed in the solenoid 138, a port 144 connected to the fluid passage 98 in the fluid pressure control unit 52 to be opened and closed by the valve member 140 and having an orifice 142 therein, and a spring 146 normally biasing the valve member 140 toward the port-opening position.

The plural input units applying their output signals to the computer 134 include a manifold vacuum detector 148 detecting the vacuum in the manifold (not shown) of the engine 2, a rotation speed detector 150 detecting the rotation speed of the crankshaft 4 of the engine 2, another rotation speed detector 152 detecting the rotation speed of the output shaft 12, and an oil temperature detector 154 detecting the temperature of lubricating oil.

Figure 3:
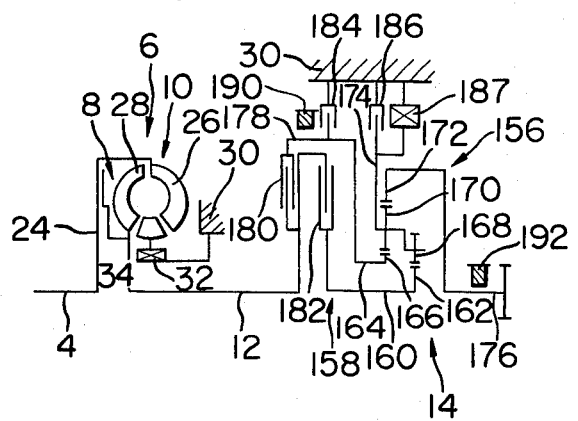
FIG. 3 is a diagrammatic view showing the structure of an transmission combined with the torque transmitting system shown in FIG. 1.
Figure 4:
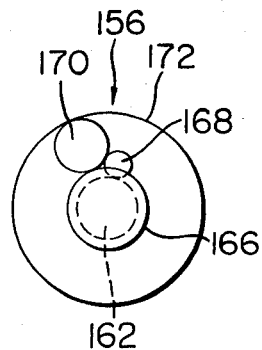
FIG. 4 is a diagrammatic view showing the arrangement of the gears in the planetary gear mechanism in the transmission shown in FIG. 3.

As shown in FIGS. 3 and 4, the transmission 14 includes a planetary gear mechanism 156 and an actuating mechanism 158 which includes friction elements for releasably fixing the gear elements of the planetary gear mechanism 156 to the housing 30 or releasably fixing together some or all of the gear elements.

The planetary gear mechanism 156 includes a small sun gear 162 fixedly mounted on a transmission input shaft 160, a large sun gear 166 fixedly mounted on an auxiliary input shaft 164 fitted on the transmission input shaft 160, a first pinion 168 making meshing engagement with the small sun gear 162, a second pinion 170 making meshing engagement with the large sun gear 166, and an annulus gear 172 making meshing engagement at its inner teeth with the second pinion 170. The first and second pinions 168 and 170 make meshing engagement with each other as shown in FIG. 4 and are carried by a carrier 174. The annulus gear 172 is coupled to a transmission output shaft 176.

The actuating mechanism 158 includes a first clutch 180 acting to couple the input shaft 12 to a drum 178 connected to the auxiliary input shaft 164 having the large sun gear 166 mounted thereon, a second clutch 182 acting to couple the output shaft 12 to the small gun gear 162, a first brake 184 acting to secure the drum 178 to the housing 30, and a second brake 186 acting to secure the carrier 174 to the housing 30. A one-way clutch 187 is provided to limit the rotation of the carrier 174 relative to the housing 30 in one direction only.

The rotation speed detector 152 detecting the rotation speed of the output shaft 12 of the torque transmitting device 6 is difficult to directly detect the rotation speed of the output shaft 12. Therefore, a detector 190 detecting the rotation speed of the drum 178 and another detector 192 detecting the rotation speed of the transmission output shaft 176 are provided, and the output signals from these two detectors 190 and 192 are subjected to arithmetic processing in a manner as will be described later, so as to indirectly detect the rotation speed of the output shaft 12.

Figure 5:
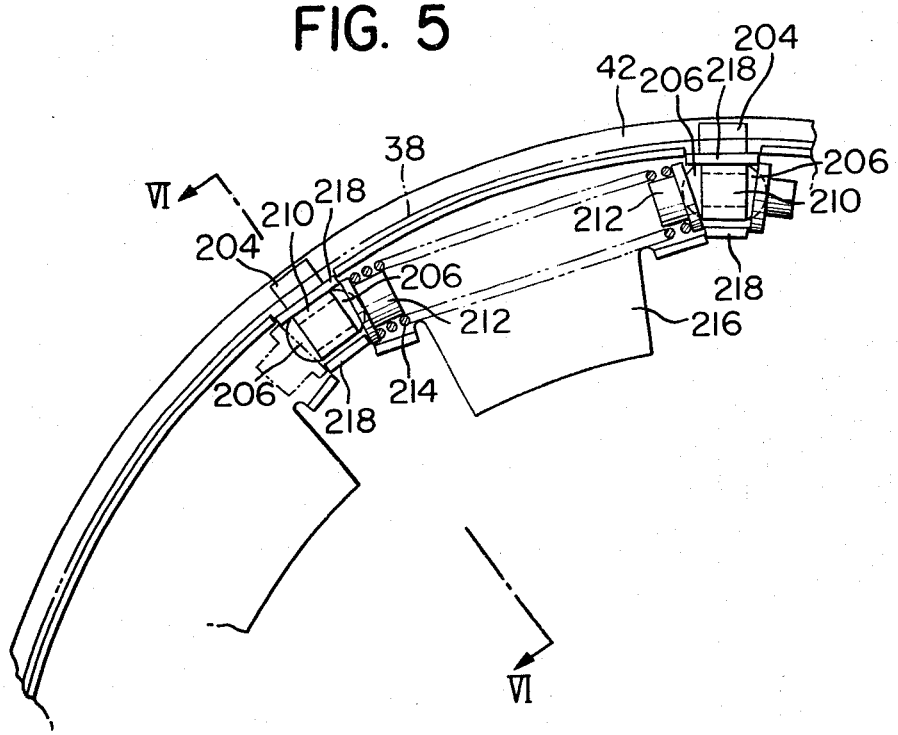
FIG. 5 is a diagrammatic partial view showing the structure of the elastic connecting device employed in the torque transmitting system shown in FIG. 1.
Figure 6:
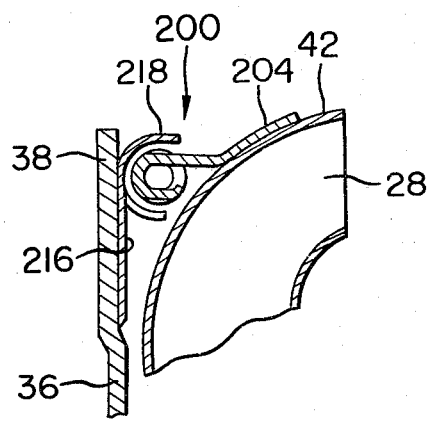
FIG. 6 is a schematic sectional view taken along the line VI—VI in FIG. 5.

As shown in FIGS. 5 and 6, the piston 36 of the friction clutch unit 8 is connected to the outer wall 42 of the turbine 28 through an elastic connecting device 200. A bracket 204 is secured to the outer wall 42 of the turbine 28 to support a spring holding memeber 210 having a pair of spherical bearing surfaces 206. A plurality of such brackets 204 are provided on the outer wall 42 in circumferentially suitably spaced apart relation, and the bearing surfaces 206 of the two adjacent spring holding members 210 hold a spring 214 therebetween through retainers 212. Stoppers 216 secured to the piston 36 are formed with stop members 218 limiting the position of the retainers 212 retaining the springs 214.

Description will now be directed to the operation of the individual units in the first embodiment of the present invention.

The drive force of the crankshaft 4 of the engine 2 is transmitted through the friction clutch unit 8 and torque convertor 10 to the transmission 14 and then transmitted to the transmission output shaft 176 by shifting operation of the transmission 14.

The transmission 14 is a known automatic transmission commonly employed for automotive vehicles, and engagement of suitably selected ones of the elements including the first clutch 180, second clutch 182, first brake 184, second brake 186 and one-way clutch 187 under control of a fluid pressure control system (not shown) provides three forward speeds and one reverse speed as shown in FIG. 7. FIG. 8 shows the number of teeth of the small sun gear 162, large sun gear 166 and annulus gear 172.

In each of the speed modes, there is the following relation between the rotation speed $N_t$ of the turbine 28 connected to the output shaft 12, the rotation speed $N_d$ of the drum 178 coupled to the large sun gear 166, and the rotation speed $N_o$ of the transmission output shaft 176:

$$N_t = (1-\gamma)N_d + \gamma N_o \quad (1)$$

where $\gamma = [Z_A(Z_{S1}+Z_{S2})]/[Z_{S1}(Z_A+Z_{S2})]$. The rotation speed of the output shaft 12 can be calculated by arithmetically processing the output signal from the detector 190 detecting the rotation speed $N_d$ of the drum 178 and the output signal from the detector 192 detecting the rotation speed $N_o$ of the transmission output shaft 176.

The fluid under pressure delivered from the oil pump 48 is supplied to the fluid supply system 16 which supplies actuating fluid under controlled pressure to the fluid chamber 44 of the fluid pressure-operated actuating unit 18 actuating the friction clutch unit 8.

No fluid under pressure is produced from the transmission operation mode detector 64 when the driver manipulating the transmission 14 selects the neutral mode, reverse mode or 1st speed mode which is the lowest speed mode. Since, in such a case, the pressure of fluid in the piston chamber 56 of the pressure reducing valve unit 50 is null, the piston 62 is urged by the force of the spring 84 toward the leftmost position shown by the two-dot chain line in FIG. 1, and the spool valve 70 is also urged toward its leftmost position shown by the broken line in FIG. 1, with the result that there is substantially no fluid flow into the fluid passage 74. Therefore, the spool valve 94 in the fluid pressure control unit 52 is held by the force of the spring 116 in the end position of its rightward stroke in FIG. 1.

On the other hand, fluid under pressure is produced from the transmission operation mode detector 64 when the transmission 14 is selected to operate in the 2nd speed mode or 3rd speed mode, and the piston 62 is urged toward its rightmost position shown by the solid line in FIG. 1 to be held in that position. Thus, the spool valve 70 moves between the solid-line position and the broken-line position shown in FIG. 1, so that the pressure of fluid supplied from the oil pump 48 to the fluid passage 75 is regulated at a predetermined value of for example 3.5 kg/cm² determined by the biasing force of the spring 84, and fluid under regulated pressure is supplied from the fluid passage 74 to the fluid passage 98 of the fluid pressure control unit 52.

The operation of the fluid pressure control unit 52 will next be described.

Fluid under pressure delivered from the oil pump 48 is supplied to the fluid passage 112 of the fluid pressure control unit 52, and fluid under regulated pressure is supplied from the torque convertor control valve 123 to the fluid passage 104, while fluid under regulated pressure is also supplied from the pressure reducing valve unit 50 to the fluid passage 98.

When the pressure of fluid in the fluid passage 74 of the pressure reducing valve unit 50 is substantially null, the spool valve 94 in the fluid pressure control unit 52 is urged by the biasing force of the spring 116 toward the end position of its rightward stroke shown by the solid line in FIG. 1 to be held in that position. Consequently, no fluid under pressure flows through the fluid passage 110 communicating with the fluid chamber 44 of the fluid pressure-operated actuating unit 18 actuating the friction clutch unit 8, and fluid under pressure flowing through the fluid passage 104 connected to the torque convertor control valve 123 is supplied to the fluid passage 106 connected to the auxiliary fluid chamber 126. Consequently, the piston 36 of the friction clutch unit 8 is urged toward the right in FIG. 1 to be disengaged from the flywheel 24.

When the fluid under predetermined pressure is supplied from the pressure reducing valve unit 50 to the fluid passage 98 of the fluid pressure control unit 52, the pressure of the fluid flowing through this fluid passage 98 is controlled by the solenoid valve 132 whose valve member 140 opens and closes the port 144 as required. When the pressure of fluid flowing through this fluid passage 98 is high, the spool valve 94 is urged toward the left from the postion shown in FIG. 1, while when the fluid pressure is low, the spool valve 94 is urged toward the illustrated position.

When the spool valve 94 is urged leftward, the fluid passage 110 communicates with the fluid passage 112, while when the spool valve 94 is urged toward the illustrated position, the fluid passage 110 communicates with the fluid passage 108. In the former case in which the fluid passage 110 is in communication with the fluid passage 112, fluid under pressure delivered from the oil pump 48 is supplied to the fluid chamber 44 through the space 130 surrounding the output shaft 12 and through the internal space of the pump 26, and the auxiliary fluid chamber 126 is connected to the oil cooler 128 through the fluid passages 124, 106 and 108, with the result that the piston 36 is urged in the direction of engagement with the flywheel 24, and fluid under pressure in the auxiliary fluid chamber 126 flows to the lubricating system (not shown) for the transmission 14. In the latter case in which the fluid passage 110 is in communication with the fluid passage 108, fluid under pressure is discharged from the fluid chamber 44 to the oil cooler 128, thence, to the transmission lubricating system. On the other hand, the fluid passage 106 is in communication with the fluid passage 104, and fluid under pressure is supplied from the torque convertor control valve 123 to the auxiliary fluid chamber 126 to urge the piston 36 in the direction of disengagement from the flywheel 24.

The electrical control by the computer 134 is such that the pulse width (the duty ratio) of the pulse current supplied to the solenoid valve 132 is changed to control the ratio between the open time and the closed time of the port 144 opened and closed by the valve member 140, thereby controlling the pressure of fluid flowing through the fluid passage 98.

The manner of controlling the solenoid valve 132 by the computer 134 will now be described in detail.

The mean rotation speed $N_e$ of the crankshaft 4 of the engine 2 is detected by the rotation speed detector 150. The mean rotation speed $N_t$ of the output shaft 12 is detected by the rotation speed detector 152 which processes the output signal from the rotation speed detector 190 detecting the rotation speed of the drum 178 and the output signal from the rotation speed detector 192 detecting the rotation speed of the transmission output shaft 176. The signals indicative of the detected mean rotation speeds of the engine crankshaft 4 and output shaft 12 are applied from the respective detectors 150 and 152 to the computer 134 together with the output signal from the manifold vacuum detector 148.

Figure 9:
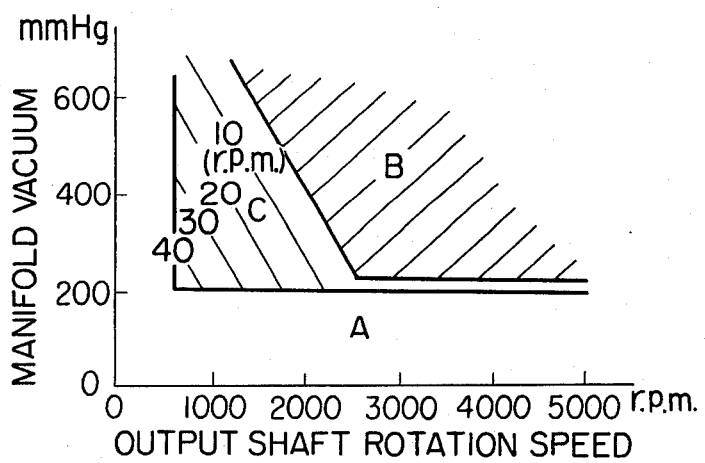
FIG. 9 is a graph showing the characteristic of the rotation speed difference controlled by the computer provided in the torque transmitting system shown in FIG. 1.

The computer 134 sets the rotation speed difference $N_s$ between the rotation speed $N_e$ of the crankshaft 4 and that $N_t$ of the output shaft 12 in response to the application of the signals from the manifold vacuum detector 148 and the rotation speed detector 150, as providing the characteristic shown in FIG. 9. The characteristic shown in FIG. 9 corresponds to the characteristic with respect to the output of the engine 2 shown in FIG. 10.

Figure 10:
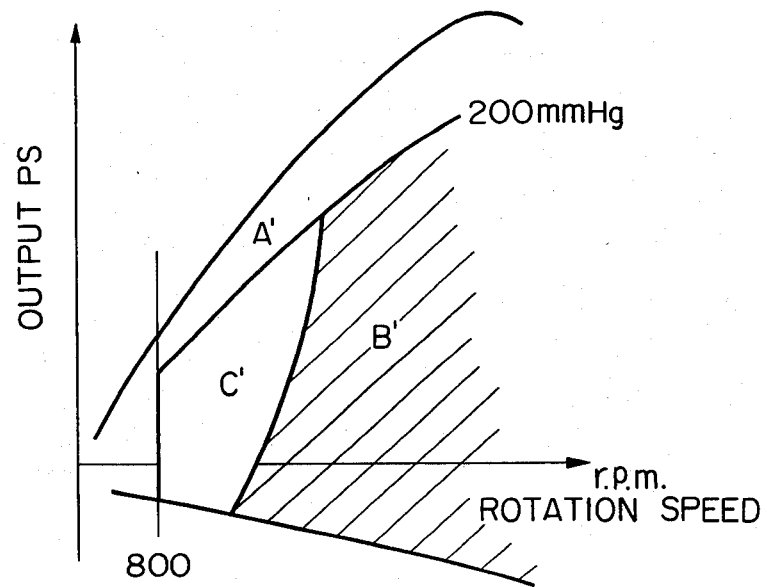
FIG. 10 is a graph showing the characteristic of the rotation speed difference with respect to the output of the engine.
Figure 11:
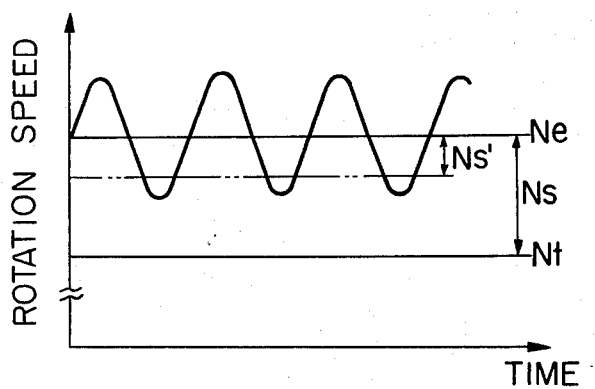
FIG. 11 is a graph showing the relation between the rotation speed of the crankshaft and that of the output shaft.
Figure 12:
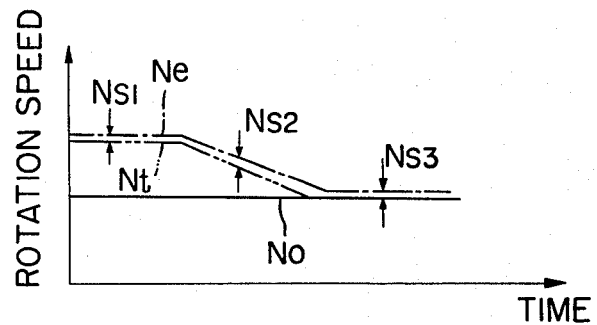
FIG. 12 is a graph showing the relation between the rotation speed of the crankshaft and that of the output shaft during a shift from one speed mode to another.

Referring to FIGS. 9 and 10, when the engine is loaded with a heavy load where the value of the manifold vacuum is less than 200 mmHg or the engine rotation speed is low or less than 800 rpm, as shown by a region A in FIG. 9 and a region A' in FIG. 10, the pulse width of the pulse current supplied to the solenoid 138 of the solenoid valve 132 is controlled to be a minimum (or substantially zero) so as to fully open the port 144 by the valve member 140 thereby maintaining the friction clutch unit 8 in its disengaged position. In another region C in FIG. 9 and in another region C' in FIG. 10 in which the value of the manifold vacuum is more than 200 mmHg and the engine rotation speed is higher than 800 rpm, the pulse width of the pulse current is controlled to meet the pre-set rotation speed difference $N_s$ which changes depending upon the manifold vacuum and engine rotation speed. In a hatched region B in FIG. 9, the pulse width of the pulse current is controlled to be its maximum, and such a pulse current is supplied to the solenoid 138 of the solenoid valve 132 so as to maintain the friction clutch unit 8 in its direct coupled position. This region B in FIG. 9 corresponds to a hatched region B' in FIG. 10.

The friction clutch unit 8 is controlled in the manner above described. Therefore, as shown by the solid line in FIG. 11, the output shaft 12 is controlled to rotate at the rotation speed $N_t$ which is lower by the pre-set rotation speed difference $N_s$ than the mean rotation speed $N_e$ of the crankshaft 4 tending to be subject to a variation due to the torque variation, so that the friction clutch unit 8 can transmit constant torque without transmitting any torque variation from the crankshaft 4 to the output shaft 12. When the pre-set rotation speed difference is relatively small as shown by the two-dot chain line $N_s'$ in FIG. 11, a very limited portion of the rotation speed variation of the crankshaft 4 may be transmitted to the output shaft 12. Even in such a case, however, the tendency of vibration of the output shaft 12 can be effectively suppressed compared with the case in which an overall rotation speed variation is transmitted to the output shaft.

The control output from the computer 134 is also controlled by the output signal from the lubricating oil temperature detector 154. When the detected oil temperature is lower than 50° C., the pulse width of the pulse current is controlled to be its minimum. Similarly, when the detected oil temperature is higher than 120° C., the pulse width of the pulse current is also controlled to be its minimum. Thus, the friction clutch unit 8 is placed in its disengaged or released position when the engine is cold or overheated.

Under control of the computer 134, the crankshaft 4 and the output shaft 12 coupled together by the friction clutch unit 8 rotate while maintaining the rotation speed difference equal to the pre-set rotation speed difference $N_s$ therebetween in the predetermined operation range of the engine. When the actually detected rotation speed difference between the crankshaft 4 and the output shaft 12 exceeds the pre-set rotation speed difference $N_s$, the pulse width of the pulse current is increased to increase the engaging force of the friction clutch unit 8, while, when the actually detected rotation speed difference is smaller than the pre-set rotation speed difference $N_s$, the pulse width of the pulse current is decreased to decrease the engaging force of the friction clutch unit 8. In this manner, the feedback control is carried out so as to continuously maintain the rotation speed difference at the pre-set value $N_s$.

Further, the control by the computer 134 is such that the increase in the pulse width of the pulse current is suitably delayed when the difference between the rotation speed of the crankshaft 4 and that of the output shaft 12 tends to increase, while the pulse width of the pulse current is quickly decreased when the rotation speed difference tends to decrease. Such a manner of control will be explained with reference to FIG. 12. In a steady running condition, the rotation speed $N_t$ of the output shaft 12, shown by the two-dot chain line, is lower by a pre-set rotation speed difference $N_{s1}$ than the rotation speed $N_e$ of the crankshaft 4 shown by the one-dot chain line. When the speed mode is shifted to a higher speed mode by manipulation of the transmission 14 under that condition, the rotation speed $N_o$ of the transmission output shaft 176 would not change although the rotation speed $N_t$ of the output shaft 12 is decreased, and the rotation speed $N_e$ of the crankshaft 4 is decreased so as to establish now a pre-set rotation speed difference $N_{s2}$ larger than the previous pre-set difference $N_{s1}$ between $N_e$ and $N_t$. Upon completion of the shifting manipulation, the output shaft 12 starts to rotate while maintaining a new pre-set rotation speed difference $N_{s3}$ between its rotation speed $N_t$ and that $N_e$ of the crankshaft 4.

By virtue of the above manner of control by the computer 134, the increase in the pulse width of the pulse current is suitably delayed to maintain a large rotation speed difference when the rotation speed difference between the crankshaft 4 and the output shaft 12 tends to increase, while the pulse width of the pulse current is quickly decreased to effectively prevent transmission of torque variation from the crankshaft 4 to the output shaft 12 when the rotation speed difference tends to decrease.

Figure 13:
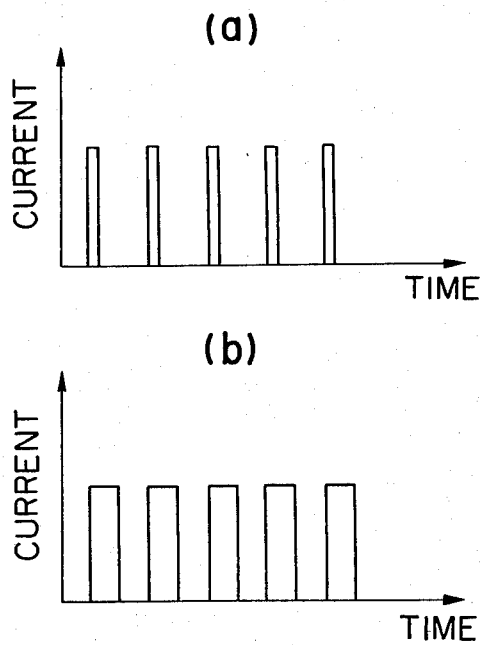
FIG. 13 shows the pulse width of the pulse current supplied under control of the computer.

The operation of the first embodiment of the present invention comprising the elements above described will now be described. In the region C shown in FIG. 9 and in the region C' shown in FIG. 10, the pressure of fluid delivered from the oil pump 48 is reduced by the pressure reducing valve unit 50, and control fluid under reduced pressure of 3.5 kg/cm² is supplied to the fluid passage 98 of the fluid pressure control unit 52. A pulse current having a variable pulse width as shown in FIG. 13 (a) or 3 (b) is supplied under control of the computer 134 to the solenoid 138 of the solenoid valve 132 in which the valve member 140 is controlled to open and close the port 144 according to the duty ratio of the pulse current. The pressure $P_2$ of control fluid flowing through the fluid passage 98 is controlled within a range of from 0.7 kg/cm² to 3.5 kg/cm². This fluid pressure $P_2$ is maintained at 0.3 kg/cm² when no pulse current is supplied to the solenoid 138 of the solenoid valve 132.

Figure 14:
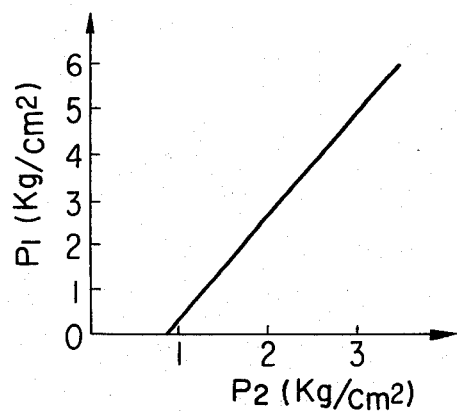
FIG. 14 is a graph showing the characteristic of the actuating fluid pressure controlled by the fluid pressure control unit in the torque transmitting system shown in FIG. 1.

In the fluid pressure control unit 52, control fluid under pressure $P_2$ flowing through the fluid passage 98 acts upon the right-hand end face 96 of the first land 88 of the spool valve 94, and, depending on the value of the pressure $P_2$, fluid delivered from the oil pump 48 appears in the fluid passage 110 as actuating fluid under pressure $P_1$ of 0 kg/cm² to 6 kg/cm². The fluid pressure $P_2$ acting upon the area of the first land 88 of the spool valve 94 is balanced by the combined force of the actuating fluid pressure $P_2$ acting upon the area difference between the second and third lands 90 and 92 of the spool valve 94 and the biasing force of the spring 116, so that the fluid pressures $P_1$ and $P_2$ have a relation as shown in FIG. 14.

The pressure $P_2$ of control fluid flowing through the fluid passage 98 is controlled by the solenoid valve 132 controlled by the pulse current. However, for the reasons that the spool valve 94 has an inertia mass, that there is the relation $X>Y$ between the distance X between the fluid passages 108 and 112 and the distance Y between the second and third lands 90 and 92 of the spool valve, and that the orifice 118 is provided in the fluid discharge passage 120 communicating with the fluid discharge chamber 114 facing the left-hand end of the spool valve 94, the spool valve 94 is not sharply responsive to the pressure $P_2$ of control fluid flowing through the fluid passage 98, thereby smoothing the level of the pressure $P_1$ of actuating fluid appearing in the fluid passage 110 to be used for clutch actuation.

Actuating fluid under pressure $P_1$ of 0 kg/cm$^2$ to 6 kg/cm$^2$ used for clutch actuation appears in the fluid passage 110 when the pressure $P_2$ of control fluid in the fluid passage 98 is 0.7 kg/cm$^2$ to 3.5 kg/cm$^2$. The actuating fluid is supplied from the fluid passage 110 to the fluid chamber 44 of the fluid pressure-operated actuating unit 18 actuating the friction clutch unit 8. The piston 36 is urged toward and onto the flywheel 24 by the force corresponding to the actuating fluid pressure $P_1$, and the flywheel 24 is engaged by the piston 36 to transmit the torque from the crankshaft 4 to the output shaft 12 to cause rotation of the latter. The computer 134 controls the actuating fluid pressure $P_1$ through the solenoid valve 132 so as to establish the predetermined difference between the rotation speed of the crankshaft 4 and that of the output shaft 12.

In the region A shown in FIG. 9 and in the region A' shown in FIG. 10, the pressure $P_2$ of control fluid in the fluid passage 98 is lower than 0.3 kg/cm$^2$, and the pressure $P_1$ of actuating fluid in the fluid passage 110 of the fluid pressure control unit 52 is reduced to zero. In the above region, the fluid passage 106 communicates with the fluid passage 104, and actuating fluid supplied from the torque convertor control valve 123 flows through the fluid passages 104 to 106 into the auxiliary fluid chamber 126 of the fluid pressure-operated actuating unit 18, thereby disengaging the piston 36 from the friction plate 40 of the flywheel 24. Consequently, the torque is transmitted from the crankshaft 4 to the output shaft 12 through the flywheel 24 and torque convertor 10.

In the region B shown in FIG. 9 and in the region B' shown in FIG. 10, the port 144 of the solenoid valve 132 connected to the fluid passage 98 is substantially normally closed by the valve member 140, and the pressure $P_2$ of control fluid in this fluid passage 98 is maintained at 3.5 kg/cm$^2$. The fluid pressure control unit 52 maintains the pressure $P_1$ of actuating fluid in the fluid passage 110 at its maximum value of 6 kg/cm$^2$, thereby bringing the piston 36 into complete engagement with the flywheel 24. Consequently, the torque is transmitted from the crankshaft 4 to the output shaft 12 through the friction clutch unit 8 only, and the torque variation, if any, is attenuated by the elastic connecting device 200 interposed between the piston 36 and the turbine 28.

The above description explains the operation of the first embodiment of the present invention in the engine operating range in which the 2nd or 3rd speed mode is selected on the transmission 14, and the temperature of lubricating oil lies within the range of 50° C. to 120° C. On the other hand, when the 1st speed mode, reverse mode or neutral mode is selected on the transmission 14 or when the temperature of lubricating oil is lower than 50° C. or higher than 120° C., the port 144 of the solenoid valve 132 connected to the fluid passage 98 is kept in its full open state with the valve member 140 maintained in its retracted position. The pressure $P_2$ of control fluid in the fluid passage 98 is maintained at a value lower than 0.3 kg/cm$^2$, and the fluid pressure control unit 52 reduces the pressure $P_1$ of actuating fluid in the fluid passage 110 to zero and maintains the pressure of actuating fluid in the fluid passage 106 at 2 kg/cm$^2$ to 3 kg/cm$^2$, therby causing complete disengagement of the piston 36 from the flywheel 24. Consequently, the torque is transmitted from the crankshaft 4 to the output shaft 12 throught the torque convertor 10.

It will be understood that, according to the first embodiment of the present invention, the drive shaft of the engine tending to rotate with torque variation is connected to the output shaft through a friction clutch unit, and the output shaft is rotated at a rotation speed which has a predetermined difference between it and that of the drive shaft. Therefore, the present invention is advantageous in that the torque can be effectively transmitted from the drive shaft to the output shaft without transmitting any torque variation, and occurrence of undesirable vibration and noise can also be effectively prevented, while, at the same time, improving the fuel consumption.

According to the embodiment of the present invention, further, the torque variation occurred in the internal combustion engine mounted on the vehicle is not transmitted to the body, wheels and other parts of the vehicle or is transmitted only to a portion of such parts. The present invention is therefore advantageous in that the engine can be operated at low speeds without obstructing its driveability within the range in which the engine generates torque large enough for driving the vehicle, thereby improving the fuel consumption, preventing occurrence of noise and facilitating the drive by virtue of the extension of the operable rotation range of the engine toward the low speed range.

Further, according to the embodiment of the present invention, the crankshaft 4 of the engine is connected to the output shaft 12 through the friction clutch unit 8 and torque convertor 10, and the friction clutch unit 8 is automatically engaged and disengaged, depending on the operating condition, by the fluid pressure-operated actuating unit 18 controlled by the computer 134. The present invention is therefore advantagous in that the operation of the friction clutch unit 8 can be reliably carried out.

Furthermore, according to the embodiment of the present invention, the friction clutch unit 8 is engaged and disengaged under feedback control by the computer 134 receiving the output signals from the detectors detecting the rotation speeds of the crankshaft 4 and output shaft 12. The present invention is therefore advantageous in that the pre-set rotation speed difference between the crankshaft 4 and the output shaft 12 can be precisely maintained by virtue of the signal processing by the computer 134.

The slip in the friction clutch unit 8 is very close to null under the floating condition in which the mean output of the engine is approximately null. According to the embodiment of the present invention, the computer 134 acts to decrease the pulse width of the pulse current supplied to the solenoid 138 of the solenoid valve 132 thereby reducing the pressure $P_2$ of control fluid in the fluid passage 98 to less than 0.7 kg/cm$^2$, in order that the value of slip can approach the pre-set rotation speed difference betweent he crankshaft 4 and the output shaft 12. Consequently, the friction clutch unit 8 is substantially disengaged or released so that the amount of torque transmitted through the friction clutch unit 8 is substantially null. Therefore, under the floating condition in which the mean output of the engine is substantially null, any substantial torque is not transmitted through the friction clutch unit 8 to the output shaft 12 due to the fact that the friction clutch unit 8 is substantially disengaged under that condition. The output torque variation varying between a positive value and a negative value is not transmitted through the friction clutch unit 8 but is fully absorbed by the torque convertor 10, so that the problem of rattling of part of the planetary gear mechanism 156 in the transmission 14 can be completely solved, and occurrence of undesirable noise and wear can be prevented.

Furthermore, according to the embodiment of the present invention, the torque variation is absorbed and attenuated by the torque convertor 10 in the disengaged state of the friction clutch unit 8, while the torque variation is absorbed and attenuated by the elastic connecting device 200 in the engaged state of the friction clutch unit 8. Therefore, generation of undesirable vibration can be effectively prevented over the entire operating range of the engine.

Further, according to the embodiment of the present invention, the pressure $P_2$ of control fluid in the fluid passage 98 is increased and decreased in a pulse-like function by the solenoid valve 132 controlled by the computer 134, while the pressure $P_1$ of actuating fluid supplied from the fluid passage 110 to the fluid pressure-operated actuating unit 18 actuating the friction clutch unit 8 is determined by the factors including the inertia mass of the spool valve 94 in the fluid pressure control unit 52, the relation $X>Y$ between the distance X between the fluid passages 108, 112 and the distance Y between the second and third lands 90, 92 of the spool valve 94, and the throttling action of the orifice 118 provided in the fluid discharge passage 120. Therefore, the actuating fluid pressure $P_1$ changes smoothly in relation to the control fluid pressure $P_2$, and the present invention is advantageous in that the fluid pressure-operated actuating unit 18 can accurately actuate the friction clutch unit 8.

Furthermore, according to the embodiment of the present invention, the solenoid valve 132 controls the pressure $P_2$ of control fluid in the fluid passage 98 disposed in the fluid pressure control unit 52 supplying actuating fluid under pressure $P_1$ to the fluid pressure-operated actuating unit 18, and such a pressure $P_2$ has been reduced to a low pressure by the pressure reducing valve unit 50 before being controlled by the solenoid valve 132. The present invention is therefore advantageous in that the solenoid valve 132 of small size and light weight can be satisfactorily used.

Furthermore, according to the embodiment of the present invention, the friction clutch unit 8 is maintained in its disengaged or released position thereby preventing transmission of undesirable vibration when the temperature of lubricating oil is low and the rotation of the engine tends to become unstable. Also, the friction clutch unit 8 is urged to its disengaged position when the temperature of lubricating oil is too high to ensure the durability of the friction clutch unit 8. The friction clutch unit 8 is also placed in its disengaged or released position when the 1st speed mode, which is the lowest speed mode at which violent torque variation occurs generally, is selected on the transmission 14. The present invention is therefore advantageous in that transmission of undesirable vibration can be reliably prevented, and the durability of the friction clutch unit 8 can be ensured.

Among the input units applying their outputs as the inputs to the computer 134 in the aforementioned embodiment of the present invention, the manifold vacuum detector 148 may be replaced by a throttle opening detector detecting the degree of opening of the throttle valve, and the lubricating oil temperature detector 154 may be replaced by a cooling water temperature detector detecting the temperature of cooling water for the engine. Employment of such detectors can also exhibit the effects similar to those described above.

In the aforementioned embodiment of the present invention, the rotation speed difference between the crankshaft 4 and the output shaft 12 is controlled to be set at the pre-set value when the manifold vacuum and engine rotation speed lie within the region C in FIG. 9 and the region C' in FIG. 10. In the region B in FIG. 9 and the region B' in FIG. 10, the rotation speed difference is reduced to zero, that is, the crankshaft 4 is coupled directly to the output shaft 12 by the friction clutch unit 8 by supplying the pulse current of maximum pulse width to the solenoid valve 132 under control of the computer 134. In such a case, the elastic connecting device 200 disposed between the piston 36 and the outer wall 42 of the turbine 28 acts to prevent transmission of undesirable vibration. However, this elastic connecting device 200 may be eliminated, and the piston 36 may be slidably mounted on the turbine 28 or output shaft 12 for integral rotation with the latter. In such a modification, a pre-set value of the rotation speed difference in the region B in FIG. 9 and the region B' in FIG. 10 is preferably selected to be about 10 rpm so as to prevent transmission of undesirable vibration due to the torque variation in the regions B and B'.

In the aforementioned embodiment of the present invention, the increase in the pulse width of the pulse current supplied to the solenoid valve 132 is suitably delayed to maintain a large rotation speed difference when the rotation speed difference between the crankshaft 4 and the output shaft 12 tends to increase, while the pulse width of the pulse current is quickly decreased when the rotation speed difference tends to decrease, so that the rate of slip of the friction clutch unit 8 especially during a shift from one speed mode to another is increased, and the torque convertor 10 can absorb the shock occurring during such a shift to some extent. In lieu of the above arrangement, another arrangement which is also effective for preventing impartation of shock during a shift from one speed mode to another may be added to the first embodiment of the present invention.

This modified arrangement includes a shift detecting circuit which is connected to the computer 134 whose detailed structure is not shown. On the basis of the output signal from the rotation speed detector 152 detecting the rotation speed of the output shaft 12 or the output signal from the detector 190 detecting the rotation speed of the drum 178 in the transmission 14, the shift detecting circuit detects a change in the rotation speed and determines that the transmission 14 is being shifted from one speed mode to another when the rate of change of the rotation speed exceeds a predetermined level. During the shift, the rotation speed of the drum 178 changes abruptly from zero to a value equal to the rotation speed of the transmission output shaft 176 or from the latter value to zero, so that the shift detecting circuit can determine that the speed mode is being shifted when the detector 190 detects a large rate of change of the rotation speed of the drum 178.

According to the above arrangement, the pulse width of the pulse current supplied to the solenoid valve 132 is decreased to its minimum or substantially zero under control of the computer 134, and the valve member 140 is retracted to fully open the port 144, when the shift detecting circuit detects a shift of the speed mode on the basis of the fact that the rate of change of the rotation speed of the output shaft 12 or drum 178 exceeds the predetermined level. Consequently, the pressure $P_2$ of control fluid in the fluid passage 98 is reduced to less than the predetermined level and the spool valve 94 in the fluid pressure control unit 52 is urged by the force of the spring 116 toward the rightmost position shown by the solid line in FIG. 1. Consequently, fluid is discharged from the fluid chamber 44 of the fluid pressure-operated actuating unit 18 into the oil cooler 128, while, at the same time, actuating fluid is supplied from the torque convertor control valve 123 to the auxiliary fluid chamber 126 thereby disengaging or releasing the friction clutch unit 8. Therefore, when the speed mode is being shifted, the drive torque is transmitted through the torque convertor 10 to alleviate the shock during the shift as in the case of a conventional automatic transmission, while when the speed mode is not shifted, the friction clutch unit 8 is engaged or applied to directly couple the parts of the fluid coupling, thereby permitting direct coupling at the lower speed mode and reducing the fuel consumption. At the engine rotation speed lower than 800 rpm, the pressure of actuating fluid supplied to the fluid pressure-operated actuating unit 18 actuating the friction clutch unit 8 is reduced. Also, when the brakes of the vehicle are abruptly applied, the rate of change of the rotation speed of the output shaft 12 or drum 178 becomes more than the predetermined level, and the pressure of actuating fluid is similarly reduced to cause disengagement of the friction clutch unit 8 so that undesirable stalling of the engine can be effectively prevented.

Figure 15:
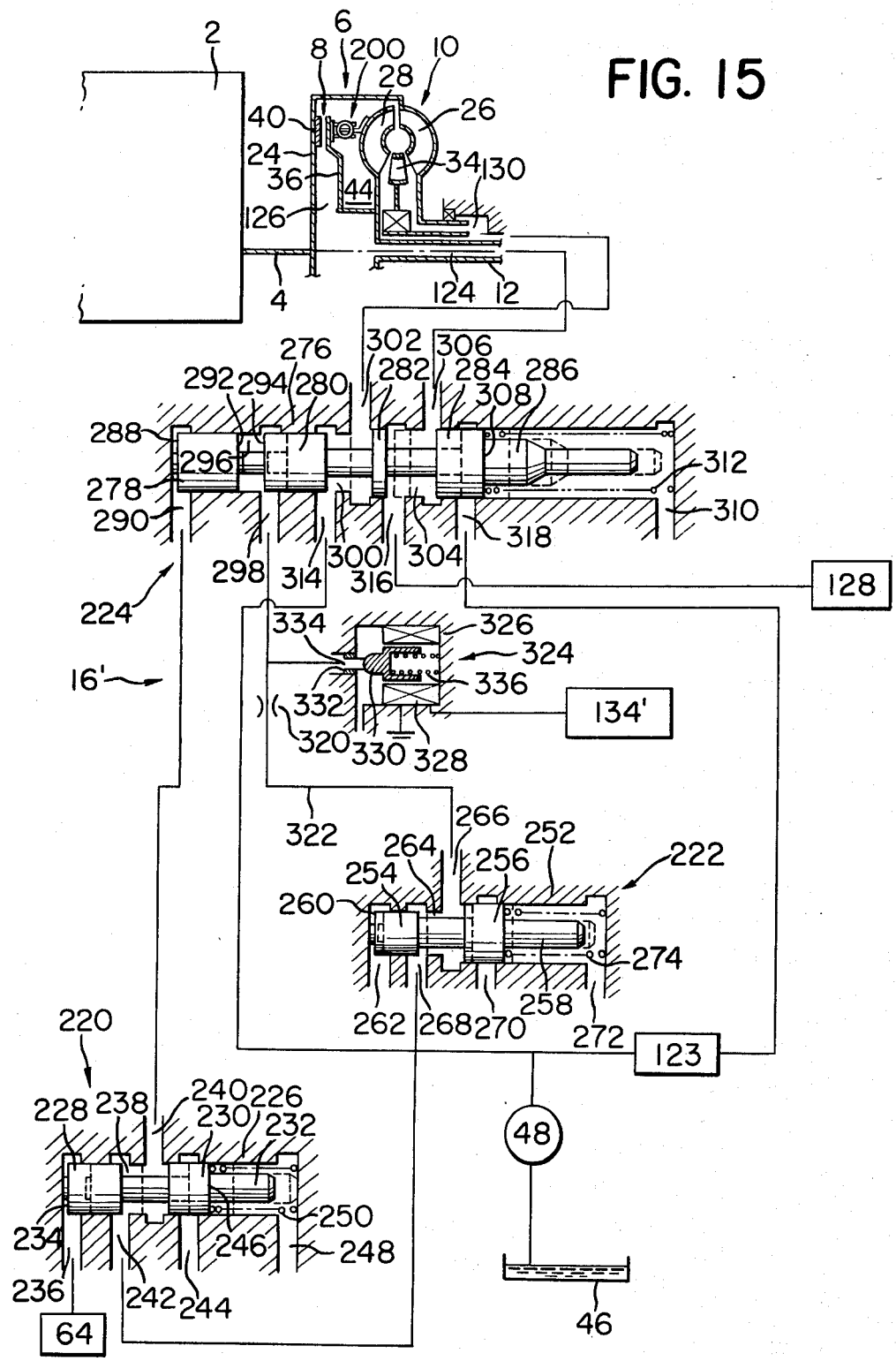
FIG. 15 is a schematic sectional view showing the structure of a second embodiment of the torque transmitting system according to the present invention.

A second embodiment of the present invention will next be described with reference to FIG. 15. In FIG. 15, the parts which are the same as or equivalent to those in the first embodiment are designated by the same reference numerals to avoid repetition of the same explanations.

Referring to FIG. 15, a fluid supply system 16' includes a selector valve unit 220, a pressure reducing valve unit 222 and a fluid pressure control unit 224. The selector valve unit 220 includes a cylinder 226, a spool valve 232 disposed in the cylinder and having a first land 228 and a second land 230, a fluid passage 236 facing the left-hand end face 234 of the first land 228 of the spool valve and connected to a transmission operation mode detector 64 which produces fluid under pressure when the transmission 14 is selected to operate in its 2nd speed mode or 3rd speed mode, a fluid passage 240 communicating always with a fluid chamer 238 defined between the first and second lands 228 and 230 of the spool valve, a fluid passage 242 connected to the oil pump 48 and communicating with the fluid chamber 238 when the spool valve 232 lies in the vicinity of its leftmost position shown by the solid line in FIG. 15, a fluid discharge passage 244 communicating with the fluid chamber 238 when the spool valve 232 lies in the vicinity of its rightmost position shown by the dotted line in FIG. 15, a fluid discharge passage 248 facing the right-hand end face 246 of the second land 230 of the spool valve, and a spring 250 normally biasing the spool valve 232 to the left toward its solid-line position.

The pressure reducing valve unit 222 includes a cylinder 252, a spool valve 258 disposed in the cylinder and having a first land 254 of small sectional area and a second land 256 of large sectional area, a fluid discharge passage 262 facing the left-hand end face 260 of the first land 254 of the spool valve, a fluid passage 266 communicating always with a fluid chamber 264 defined between the first and second lands 254 and 256 of the spool valve, a fluid passage 268 connected to the oil pump 48 and communicating with the fluid chamber 264 when the spool valve 258 lies in the vicinity of its leftmost position shown by the solid line in FIG. 15, a fluid discharge passage 270 communicating wih the fluid chamber 264 when the spool valve 258 lies in the vicinity of the end of its rightward stroke as a result of its rightward movement, a fluid discharge passage 272 facing the right-hand end face of the second land 256 of the spool valve, and a spring 274 normally biasing the spool valve 258 to the left toward its solid-line position.

The fluid pressure control unit 224 includes a cylinder 276, a piston 278 disposed in the cylinder, a spool valve 286 disposed also in the cylinder 276 and having a first land 280 of sectional area equal to that of the piston 278, a second land 282 of sectional area larger than that of the first land 280 and a third land 284 of sectional area equal to that of the second land 282, a fluid passage 290 facing the left-hand end face 288 of the piston 278 and communicating with the fluid passage 240 in the selector valve unit 220, a fluid passage 298 communicating always with a fluid chamber 296 defined between the right-hand end face 292 of the piston 278 and the left-hand end face 294 of the first land 280 of the spool valve, a fluid passage 302 communicating always with a fluid chamber 300 defined between the first and second lands 280 and 282 of the spool valve, a fluid passage 306 communicating always with a fluid chamber 304 defined between the second and third lands 282 and 284 of the spool valve, a fluid discharge passage 310 facing the right-hand end face 308 of the third land 284 of the spool valve, a spring 312 abutting the right-hand end face 308 of the third land 284 of the spool valve 286 for normally biasing the spool valve to the left toward the position shown by the solid line in FIG. 15, a fluid passage 314 connected to the oil pump 48 and communicating with the fluid chamber 300 when the spool valve 286 lies in the vicinity of its leftmost position, a fluid passage 316 communicating with the fluid chamber 304 when the spool valve 286 lies in the vicinity of its leftmost position and communicating with the fluid chamber 300 when the spool valve 286 lies in the vicinity of the end of its rightward stroke, and a fluid passage 318 communicating with the fluid chamber 304 when the spool valve 286 lies in the vicinity of the end of its rightward stroke. The fluid passage 298 communicates with the fluid passage 266 in the pressure reducing valve unit 222 through a fluid passage 322 having an orifice 320 therein. The fluid passage 316 is connected to the oil cooler 128, and the fluid passage 318 is connected to the torque convertor control valve 123.

A solenoid valve 324 includes a housing 326, a solenoid 328 disposed in the housing, a valve member 330 disposed in the solenoid 328, a port 334 connected to the fluid passage 322 at a point between the orifice 320 in the fluid passage 322 and the fluid pressure control unit 224 to be opened and closed by the valve member 330 and having an orifice 332 provided therein, and a spring 336 normally biasing the valve member 330 in the port-closing direction. The port 334 of the solenoid valve 324 is opened and closed by the valve member 330 in response to a pulse current supplied to the solenoid valve 324 under control of a computer 134'. The characteristic of the pulse current supplied to the solenoid valve 324 under control of this computer 134' is reverse to that of the pulse current supplied to the solenoid valve 132 under control of the computer 134 in the first embodiment. In the second embodiment, the pulse width of the pulse current is selected to be small when the rotation speed difference between the crankshaft 4 and the output shaft 12 is larger than a pre-set rotation speed difference, while the pulse width is selected to be large when the rotation speed difference is smaller than the pre-set difference. Thus, in the region A shown in FIG. 9, the pulse width of the pulse current is selected to be its maximum, while in the region B, the pulse width is selected to be its minimum.

The operation of the second embodiment of the present invention having the above structure will now be described.

When the transmission 14 shown in FIG. 3 is selected to operate in the 2nd speed mode or 3rd speed mode, fluid under pressure is supplied from the transmission operation mode detector 64 to the fluid passage 236 in the selector valve unit 220, and the spool valve 232 is urged toward and maintained in the position shown by the dotted line in FIG. 15 against the biasing force of the spring 250. Consequently, the fluid passage 240 communicates through the fluid chamber 238 with the fluid discharge passage 244, and the fluid passage 290 in the fluid pressure control unit 224 is opened to the atmosphere, thereby maintaining the piston 278 in the position shown by the solid line in FIG. 15.

Fluid under pressure delivered from the oil pump 48 is supplied to the fluid chamber 264 in the pressure reducing valve unit 222, and its pressure is reduced to and maintained at the value of for example 3.5 kg/cm$^2$ which is determined by the area difference between the first and second lands 254 and 256 of the spool valve 258 and also by the biasing force of the spring 274. Fluid under reduced pressure of 3.5 kg/cm$^2$ appears in the fluid passage 266, and, as a result of open-close control of the port 334 by the valve member 330 of the solenoid valve 324, control fluid under pressure P$_2$ of 0.7 kg/cm$^2$ to 3.5 kg/cm$^2$ is supplied to the fluid passage 298 and fluid chamber 296 in the fluid pressure control unit 224. When the piston 278 in the fluid pressure control unit 224 is maintained in the position shown by the solid line in FIG. 15, control fluid under pressure P$_2$ controlled by the solenoid valve 324 is supplied by way of the fluid passage 298 to the fluid chamber 296. The pressure P$_1$ of actuating fluid in the fluid chamber 300 is controlled relative to the pressure P$_2$ in a manner similar to that shown in FIG. 14. The controlling factors include the relation between the fluid pressure P$_2$ and the area of the left-hand end force 294 of the first land 280 of the spool valve 286, the relation between the pressure of fluid supplied to the fluid chamber 300 from the oil pump 48 and the area difference between the right-hand end face of the first land 280 and the left-hand end face of the second land 282 of the spool valve 286, and the biasing force of the spring 312. Actuating fluid under controlled pressure P$_1$ is supplied to the fluid chamber 44 by way of the fluid passage 302 and through the fluid passage 130 formed around the output shaft 12 so as to urge the piston 36 into engagement with the friction plate 40 of the flywheel 24.

As in the case of the first embodiment, the pressure P$_1$ of actuating fluid is subjected to feedback control by the computer 134' so that the rotation speed difference between the crankshaft 4 and the output shaft 12 can be maintained at the pre-set value.

When, on the other hand, the transmission 14 is selected to operate in the 1st speed mode, reverse mode or neutral mode, and no fluid under pressure is produced from the transmission operation mode detector 64, the spool valve 232 in the selector valve unit 220 is kept in the position shown by the solid line in FIG. 15, and fluid under pressure delivered from the oil pump 48 is supplied to the fluid passage 290 in the fluid pressure control unit 224 by way of the fluid passage 242, fluid chamber 238 and fluid passage 240. Consequently, the piston 278 in the fluid pressure control unit 224 is now urged toward the right in FIG. 15, and the spool valve 286 is urged toward and maintained in the position shown by the dotted line in FIG. 15.

The pressure of fluid flowing through the fluid passage 322 is maximum when the port 334 of the solenoid valve 324 is substantially fully closed by the valve member 330. In this case, fluid of maximum pressure is supplied from the fluid passage 322 to the fluid chamber 296 in the fluid pressure control unit 224, so that the spool valve 286 is similarly urged toward and maintained in the dotted line position, as in the above case.

When the spool valve 286 is thus maintained in the dotted line position above described, the fluid passage 302 communicates with the fluid passage 316 through the fluid chamber 300, with the result that the pressure of fluid in the fluid chamber 44 of the friction clutch unit 8 is reduced. At this time, the fluid passage 306 communicates with the torque convertor control valve 123 via the fluid chamber 304 and fluid passage 318, and fluid under pressure is supplied from the torque convertor control valve 123 to the auxiliary fluid chamber 12b of the friction clutch unit 8. Consequently, the piston 36 is urged toward the right in FIG. 15, and the friction clutch unit 8 is disengaged or released, so that the torque is transmitted from the crankshaft 4 to the output shaft 12 through the torque convertor 10 only.

It will be readily apparent that the second embodiment of the present invention exhibits the effects similar to those exhibited by the first embodiment.

Figure 16:
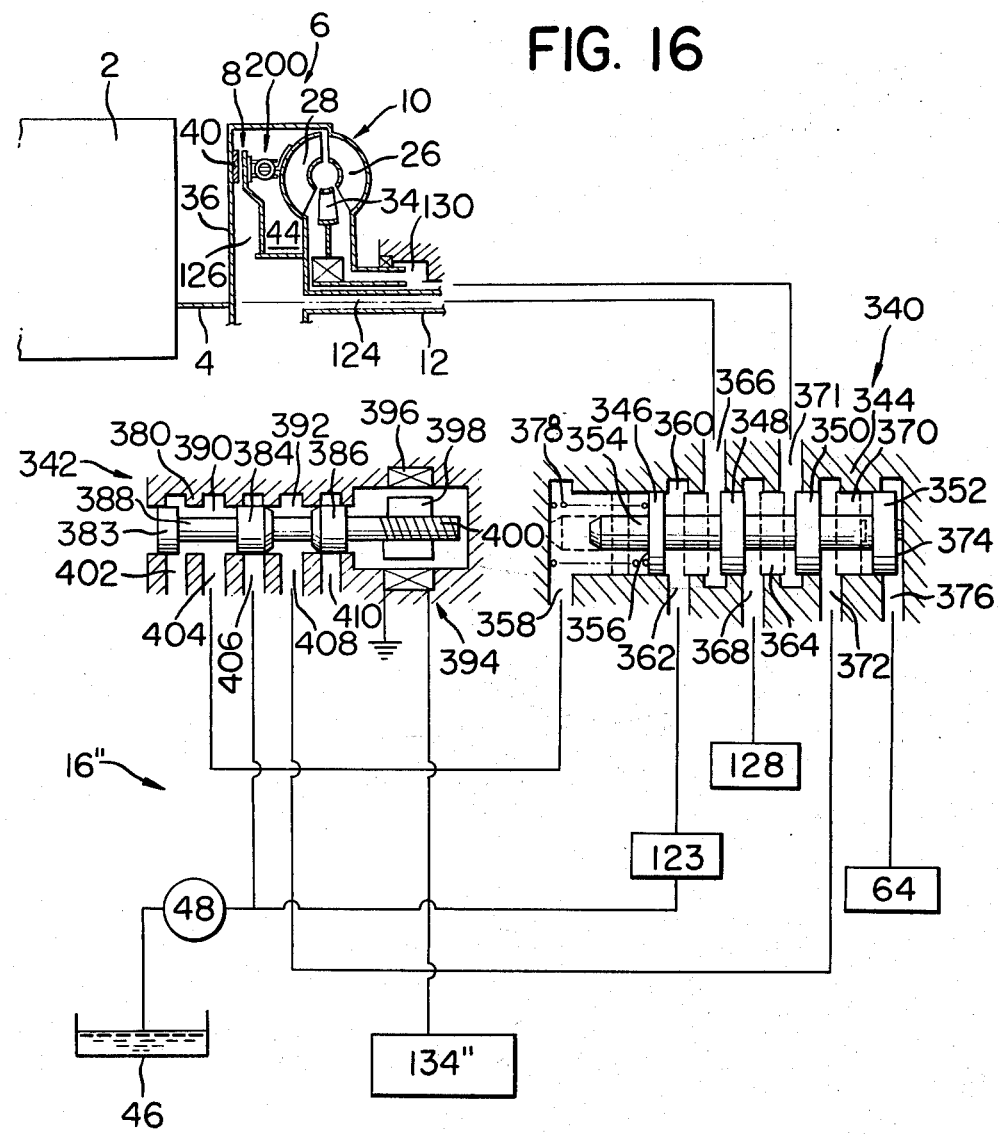
FIG. 16 is a schematic sectional view showing the structure of a third embodiment of the torque transmitting system according to the present invention.

A third embodiment of the present invention will next be described with reference to FIG. 16. In FIG. 16, the parts which are the same as or equivalent to those in the first embodiment are designated by the same reference numerals to avoid repetition of the same explanations, like the second embodiment.

Referring to FIG. 16, a fluid supply system 16" includes a selector valve unit 340 and a fluid pressure control unit 342.

The selector valve unit 340 includes a cylinder 344, a spool valve 354 disposed in the cylinder and having a first land 346, a second land 348, a third land 350 and a fourth land 352, a fluid passage 358 facing the left-hand end face 356 of the first land 346 of the spool valve, a fluid passage 362 communicating always with a fluid chamber 360 defined between the first and second lands 346 and 348 of the spool valve, a fluid passage 366 communicating with the fluid chamber 360 when the spool valve 354 lies in the vicinity of its rightmost position but communicating with a fluid chamber 364 defined between the second and third lands 348 and 350 of the spool valve 354 when the spool valve lies in the vicinity of its leftmost position, a fluid passage 368 communicating always with the fluid chamber 364, a fluid passage 371 communicating with a fluid chamber 370 defined between the third and fourth lands 350 and 352 of the spool valve 354 when the spool valve lies in the vicinity of its leftmost position but communicating with the fluid chamber 364 when the spool valve 354 lies in the vicinity of its rightmost position, a fluid passage 372 communicating always with the fluid chamber 370, a fluid passage 376 facing the right-hand end face 374 of the fourth land 352 of the spool valve, and a spring 378 abutting the left-hand end face 356 of the first land 346 of the spool valve 354 for normally biasing the spool valve to the right toward the dotted line position in FIG. 16. The fluid passage 362 is connected to the torque convertor control valve 123, and the fluid passage 366 communicates with the auxiliary fluid chamber 126 through the fluid passage 124 provided in the output shaft 12. The fluid passage 371 communicates with the fluid chamber 44 through the fluid passage 130 formed around the output shaft 12, and the fluid passage 376 is connected to the transmission operation mode detector 64 which produces fluid under pressure when the transmission 14 is selected to operate in the 2nd speed mode or 3rd speed mode.

The fluid pressure control unit 342 includes a cylinder 380, a spool valve 388 disposed in the cylinder and having a first land 383, a second land 384 and a third land 386, a fluid chamber 390 defined between the first and second lands 383 and 384 of the spool valve, a fluid chamber 392 defined between the second and third lands 384 and 386 of the spool valve, and a pulse motor 394 connected to the right-hand end of the spool valve 388. The pulse motor 394 includes a coil 396 and a rotor 398, and an externally threaded rod 400 extending from the right-hand end of the spool valve 388 makes threaded engagement with the internally threaded portion of the rotor 398. A pulse current including positive or negative pulse or pulses is supplied to the coil 396 under control of a computer 134″ so that the rotor 398 is rotated through a predetermined unit angle around its axis in response to the application of a single pulse to the coil 396. The rotation of the rotor 398 causes leftward or rightward movement of the spool valve 388 over a predetermined unit distance corresponding to the unit angle. A plurality of fluid passages are provided in the cylinder 380 and include a fluid discharge passage 402 communicating with the fluid chamber 390 when the spool valve 388 lies in the vicinity of its leftmost position, a fluid passage 404 communicating always with the fluid chamber 390, a fluid passage 406 openably closed by the second land 384 of the spool valve 388 and communicating with the fluid chamber 390 when the spool valve 388 lies in the vicinity of its rightmost position and with the fluid chamber 392 when the spool valve lies in the vicinity of its leftmost position, a fluid passage 408 communicating always with the fluid chamber 392, and a fluid discharge passage 410 openably closed by the third land 386 of the spool valve 388 and communicating with the fluid chamber 392 when the spool valve lies in the vicinity of its rightmost position. The fluid passage 404 is connected to the fluid passage 358 in the selector valve unit 340, the fluid passage 406 is connected to the oil pump 48, and the fluid passage 408 is connected to the fluid passage 372 in the selector valve unit 340.

A plurality of input units (not shown) similar to those connected to the computer 134 in the first embodiment are connected to the computer 134″. When the rotation speed difference between the crankshaft 4 and the output shaft 12 is detected to be larger than the pre-set value as a result of comparison, a pulse current including a positive unit pulse or pulses is supplied to the coil 396 of the pulse motor 394 under control of the computer 134″, while, when the result of comparison proves that the former is smaller than the latter, a pulse current including a negative unit pulse or pulses in supplied to the coil 396.

In response to the application of a unit pulse to the pulse motor 394, the rotor 398 is rotated through a unit angle, and the rotation of the rotor 398 threaded to the rod 400 causes rightward or leftward movement of the spool valve 388 over a unit distance. The arrangement is such that the spool valve 388 is urged leftward over the unit distance in response to the application of the positive unit pulse to the pulse motor 394 and rightward over the unit distance in response to the application of the negative unit pulse.

The operation of the third embodiment of the present invention having the above structure will now be described.

When the transmission 14 shown in FIG. 3 is selected to operate in its 2nd speed mode or 3rd speed mode, fluid under pressure is supplied from the transmission operation mode detector 64 to the fluid passage 376 in the selector valve unit 340, and the spool valve 354 is moved toward and maintained in the position shown by the dotted line in FIG. 16 against the biasing force of the spring 378. Consequently, the fluid passage 371 communicates through the fluid chamber 370 with the fluid passage 372, and the fluid passage 366 communicates through the fluid chamber 364 with the fluid passage 368.

The positive pulse current is supplied to the pulse motor 394 in the fluid pressure control unit 342 under control of the computer 134″ when the rotation speed difference between the crankshaft 4 and the output shaft 12 is larger than the pre-set value, and the spool valve 388 is moved leftward to permit communication of the fluid passage 408 with the fluid passage 406 through the fluid chamber 392. Consequently, fluid under pressure delivered from the oil pump 48 is supplied to the fluid passage 372 in the selector valve unit 340 via the fluid passage 406, fluid chamber 392 and fluid passage 408, and is then supplied to the fluid chamber 44 of the friction clutch unit 8 via the fluid passages 371 and 130, thereby urging the piston 36 into engagement with the friction plate 40 of the flywheel 24.

Then, when the rotation speed difference between the crankshaft 4 and the output shaft 12 becomes smaller than the pre-set value as a result of the above control operation, the negative pulse current is now supplied to the pulse motor 394 under control of the computer 134″, and the spool valve 388 is moved rightward to interrupt the communication between the fluid passages 408 and 406. With further rightward movement of the spool valve 388, the fluid passage 408 communicates with the fluid discharge passage 410 to reduce the pressure of fluid, with the result that the friction clutch unit 8 is actuated in the disengaging or releasing direction thereby increasing the rotation speed difference between the crankshaft 4 and the output shaft 12. In this manner, the difference between the rotation speed of the crankshaft 4 and that of the output shaft 12 can be maintained at the pre-set value.

On the other hand, when the transmission 14 is selected to operate in its 1st speed mode, reverse mode or neutral mode, no fluid under pressure is produced from the transmission operation mode detector 64, and the spool valve 354 in the selector valve unit 340 is maintained in the position shown by the solid line in FIG. 16. In this position of the spool valve 354, the fluid passage 366 communicates through the fluid chamber 360 with the fluid passage 362, and fluid under pressure is supplied from the torque convertor control valve 123 to the fluid passage 366. Also, the fluid passage 371 communicates through the fluid chamber 364 with the fluid passage 368 which is connected to the oil cooler 128. Therefore, fluid under pressure from the torque convertor control valve 123 is supplied to the auxiliary fluid chamber 126 of the friction clutch unit 8, while the pressure of fluid in the fluid chamber 44 is reduced. Consequently, the friction clutch unit 8 is disengaged, and the torque is transmitted from the crankshaft 4 to the output shaft 12 through the torque convertor 10 only.

It will be readily apparent that the third embodiment of the present invention exhibits also the effects similar to those exhibited by the first embodiment.

What is claimed is:

1. A torque transmitting system comprising a drive shaft rotating with torsional vibration, an output shaft, a friction clutch unit interposed between said drive shaft and said output shaft, fluid pressure-operated actuating means for causing engagement and disengagement of said friction clutch unit, means for detecting the operating condition of a drive power source driving said drive shaft, means for detecting the difference between the rotation speed of said drive shaft and that of said output shaft, means for setting the rotation speed difference between said drive shaft and said output shaft in response to the output signal from said operating condition detecting means, and fluid pressure control means for controlling the pressure of actuating fluid supplied to said fluid pressure-operated actuating means so that the rotation speed difference detected by said rotation speed difference detecting means approaches the rotation speed difference set by said rotation speed difference setting means.

2. A torque transmitting system as claimed in claim 1, wherein said drive power source is an internal combustion engine, and said operating condition detecting means includes a load detector detecting the load of said internal combustion engine and a rotation speed detector detecting the rotation speed of at least one of said drive shaft and said output shaft.

3. A torque transmitting system as claimed in claim 1, wherein said fluid pressure control means includes a source of fluid under pressure, a fluid pressure control valve unit disposed midway of a fluid path supplying fluid under pressure from said fluid source to said fluid pressure-operated actuating means and controlling the pressure of actuating fluid supplied to said fluid pressure-operated actuating means, a solenoid valve for controlling the pressure of control fluid flowing through an orifice to act upon said fluid pressure control valve unit, and a current control unit for supplying to said solenoid valve a control current produced on the basis of the output signals from said rotation speed difference setting means and said rotation speed difference detecting means, fluid under pressure from said fluid source being supplied through said orifice to a port opened and closed by said solenoid valve so that control fluid of controlled pressure flowing between said orifice and said port acts upon said fluid pressure control valve unit, whereby said fluid pressure control valve unit controls the pressure of actuating fluid supplied from said fluid source to said fluid pressure-operated actuating means depending on the level of the pressure of control fluid.

4. A torque transmitting system as claimed in claim 3, wherein said solenoid valve acts to open and close said port in response to a pulse signal applied from said current control unit, and the pulse width of said pulse signal is controlled to control the ratio between the open time and the closed time of said port thereby changing the pressure of control fluid.

5. A torque transmitting system as claimed in claim 3, wherein a pressure reducing valve unit is disposed midway of the fluid path between said fluid source and said orifice for reducing the pressure of fluid supplied from said fluid source to said orifice to a predetermined low level.

6. A torque transmitting system as claimed in claim 4, wherein said fluid pressure-operated actuating means includes a supply-side fluid chamber and a release-side auxiliary fluid chamber for engaging said friction clutch unit when actuating fluid is supplied to said supply-side fluid chamber and disengaging said friction clutch unit when actuating fluid is supplied to said release-side auxiliary fluid chamber.

7. A torque transmitting system as claimed in claim 6, wherein said fluid pressure control valve unit is changed over between a first position in which said actuating fluid is supplied to said supply-side fluid chamber while the fluid is discharged from said release-side auxiliary fluid chamber until the pressure of control fluid acting upon said fluid pressure control valve unit is reduced to the predetermined low level, and a second position in which said actuating fluid is supplied to said release-side auxiliary fluid chamber while the fluid is discharged from said supply-side fluid chamber when the pressure of control fluid is reduced to a level lower than a set value which is lower than the predetermined low level.

8. A torque transmitting system as claimed in claim 1, further comprising an automatic transmission of fluid coupling type for use in an automotive vehicle and having a plurality of forward speeds, the fluid coupling of said automatic transmission being connected between said drive shaft and said output shaft in parallel relation with said friction clutch unit so as to provide another path of power transmission.

9. A torque transmitting system as claimed in claim 8, further comprising transmission operation mode detecting means for applying its output signal to said fluid pressure control means when said automatic transmission is selected to operate in its neutral mode, reverse mode or lowest speed mode, said fluid pressure control means controlling the pressure of actuating fluid in response to the output signal from said transmission operation mode detecting means thereby disengaging said friction clutch unit.

10. A torque transmitting system as claimed in claim 8, wherein said rotation speed difference detecting means includes a first rotation speed detector detecting the rotation speed of said drive shaft and a second rotation speed detector detecting the rotation speed of said output shaft, and detects the rotation speed difference between said drive shaft and said output shaft by comparing the output signals from said first and second rotation speed detectors.

11. A torque transmitting system as claimed in claim 10, wherein a gear unit including a plurality of gears and a plurality of frictional engaging means for selectively engaging and disengaging the gears to provide a plurality of gear ratios is disposed between said output shaft and an output shaft of said transmission, and said second rotation speed detector includes means for detecting the individual rotation speeds of two rotary members, respectively, selected from among a plurality of rotary members constituting said gear unit and calculates the rotation speed of said output shaft on the basis of the individual rotation speeds of the two rotary members detected by said detecting means.

12. A torque transmitting system as claimed in claim 8, further comprising means for detecting the temperature of at least one of said drive power source and said automatic transmission, said fluid pressure-operated actuating means acting to disengage said friction clutch unit when the temperature detected by said temperature detecting means is higher or lower than a predetermined temperature range.

13. A torque transmitting system as claimed in claim 1, wherein said fluid pressure control means includes a source of fluid under pressure, a fluid pressure control unit including a pulse motor and a spool valve and disposed midway of a fluid path supplying fluid under pressure from said fluid source to said fluid pressure-operated actuating means, and a current control unit for supplying to said pulse motor a control current produced on the basis of the output signals from said rotation speed difference setting means and said rotation speed difference detecting means, and said pulse motor is rotated in response to said control current thereby causing corresponding displacement of said spool valve, so that the amount of actuating fluid supplied to said fluid pressure-operated actuating means is controlled depending on the displacement of said spool valve.

14. A torque transmitting system as claimed in claim 8, wherein said drive power source is an internal combustion engine, and a detector for detecting the load of said engine is additionally provided, said fluid pressure control means being responsive to the output signal from said engine load detector so as to control the pressure of actuating fluid thereby disengaging said friction clutch unit when said engine is operating in its heavy loaded condition.

15. A torque transmitting system as claimed in claim 10, wherein said fluid pressure control means is controlled by the output signal from said first rotation speed detector so as to disengage said friction clutch unit when the rotation speed of said drive shaft is lower than a predetermined value.

16. A torque transmitting system as claimed in claim 10, wherein elastic connecting means exhibiting elasticity in the direction of rotation of said drive shaft is interposed between said friction clutch unit and said output shaft, and, when the output signal from at least one of said first and second rotation speed detectors indicates that the rotation speed of said output shaft is higher than a predetermined value, said fluid pressure control means is controlled so as to disengage said friction clutch unit.

17. A torque transmitting system as claimed in claim 10, wherein, when the output signal from at least one of said first and second rotation speed detectors indicates that the rotation speed of said output shaft is higher than a predetermined value, the rotation speed difference between said drive shaft and said output shaft is set at about 10 rpm.

18. A torque transmitting system as claimed in claim 8, wherein a transmission operation mode detector for detecting whether or not said transmission is being shifted from one of the speed modes to another is additionally provided, and, when said transmission operation mode detector detects said shift, said fluid pressure control means is controlled so as to disengage said friction clutch unit.

19. A torque transmitting system as claimed in claim 18, wherein said transmission operation mode detector detects the rotation speed of said output shaft or the rotation speed of at least one of the plural rotary members in said transmission and determines that said transmission is being shifted when the rate of change of the detected rotation speed exceeds a predetermined level.

20. A torque transmitting system as claimed in claim 8, wherein, when the mean output between said drive shaft and said output shaft is substantially null, said fluid pressure control means is controlled so as to disengage said friction clutch unit.

* * * * *